US011403554B2

(12) United States Patent
Wagner et al.

(10) Patent No.: US 11,403,554 B2
(45) Date of Patent: Aug. 2, 2022

(54) METHOD AND APPARATUS FOR PROVIDING EFFICIENT TESTING OF SYSTEMS BY USING ARTIFICIAL INTELLIGENCE TOOLS

(71) Applicant: The Johns Hopkins University, Baltimore, MD (US)

(72) Inventors: Matthew B. Wagner, Glenwood, MD (US); David R. Witman, Halethorpe, MD (US); Peter A. Sevich, Gaithersburg, MD (US); Patrick J. Trainor, Baltimore, MD (US); Liam R. Cusack, Columbia, MD (US); William A. Patterson, Reisterstown, MD (US)

(73) Assignee: The Johns Hopkins University, Baltimore, MD (US)

( * ) Notice: Subject to any disclaimer, the term of this patent is extended or adjusted under 35 U.S.C. 154(b) by 361 days.

(21) Appl. No.: 16/260,165

(22) Filed: Jan. 29, 2019

(65) Prior Publication Data

US 2019/0236479 A1   Aug. 1, 2019

Related U.S. Application Data

(60) Provisional application No. 62/624,136, filed on Jan. 31, 2018.

(51) Int. Cl.
*G06N 20/00* (2019.01)
*G06F 30/20* (2020.01)

(52) U.S. Cl.
CPC ............. *G06N 20/00* (2019.01); *G06F 30/20* (2020.01)

(58) Field of Classification Search
CPC ..................................................... G06N 20/00
See application file for complete search history.

(56) References Cited

U.S. PATENT DOCUMENTS

| 2008/0071778 | A1* | 3/2008 | Perrone | ................ G06F 16/334 707/999.005 |
| 2017/0323239 | A1* | 11/2017 | Johnson | ............. G06Q 10/0635 |
| 2019/0179738 | A1 | 6/2019 | Hawthorne et al. | |

OTHER PUBLICATIONS

Hyunwoo Lim, Zhiqiang John Zhai. Comprehensive evaluation of the influence of meta-models on Bayesian calibration. 2017. Energy and Buildings. (Year: 2017).*
Hongwei Wang, Ziyuan Zhu, Jinglin Shi, Yongtao Su. An Accurate ACOSSO Metamodeling Technique for Processor Architecture Design Space Exploration. 2015. IEEE (Year: 2015).*

(Continued)

*Primary Examiner* — Omar F Fernandez Rivas
*Assistant Examiner* — Selene A. Haedi
(74) *Attorney, Agent, or Firm* — Noah J. Hayward

(57) ABSTRACT

An artificial intelligence testing apparatus may include processing circuitry configured to execute instructions that, when executed, cause the apparatus to create initial sample points based on a simulation received at the apparatus, and employ cyclic evaluation of the simulation until a stopping criteria is met. Employing the cyclic evaluation includes running the simulation at design points for a set of queries associated with a current iteration of the cyclic evaluation, training a set of meta-models of parameter space associated with the simulation for the current iteration, computing a set of metrics for the current iteration, and employing a selected sampling approach to select a new set of design points for a next iteration of the cyclic evaluation.

20 Claims, 8 Drawing Sheets

(56) References Cited

OTHER PUBLICATIONS

Pascal Kerschke and Heike Trautmann. Automated Algorithm Selection on Continuous Black-Box Problems By Combining Exploratory Landscape Analysis and Machine Learning. Nov. 2017. Cornell University (Year: 2017).*
Miguez et. al., "Blind Equalization of Frequency-Selective Channels by Sequential Importance Sampling", Oct. 2004 (Year: 2004).*
Martino et. al., "Effective sample size for importance sampling based on discrepancy measures", Feb. 2017 (Year: 2017).*
Van Ryzin et. al. "A Market Discovery Algorithm to Estimate a General Class of Nonparametric Choice Models", Feb. 2015 (Year: 2015).*
Acar et. al., "Ensemble of metamodels with optimized weight factors", 2009 (Year: 2009).*
Cui et. al, A recommendation system for meta-modeling: A meta-learning based approach, 2016 (Year: 2016).*
Jin et. al., "The use of metamodeling techniques for optimization under uncertainty", 2003 (Year: 2003).*
Manfren et. al., "Calibration and uncertainty analysis for computer models—A meta-model based approach for integrated building energy simulation", 2013 (Year: 2013).*

* cited by examiner

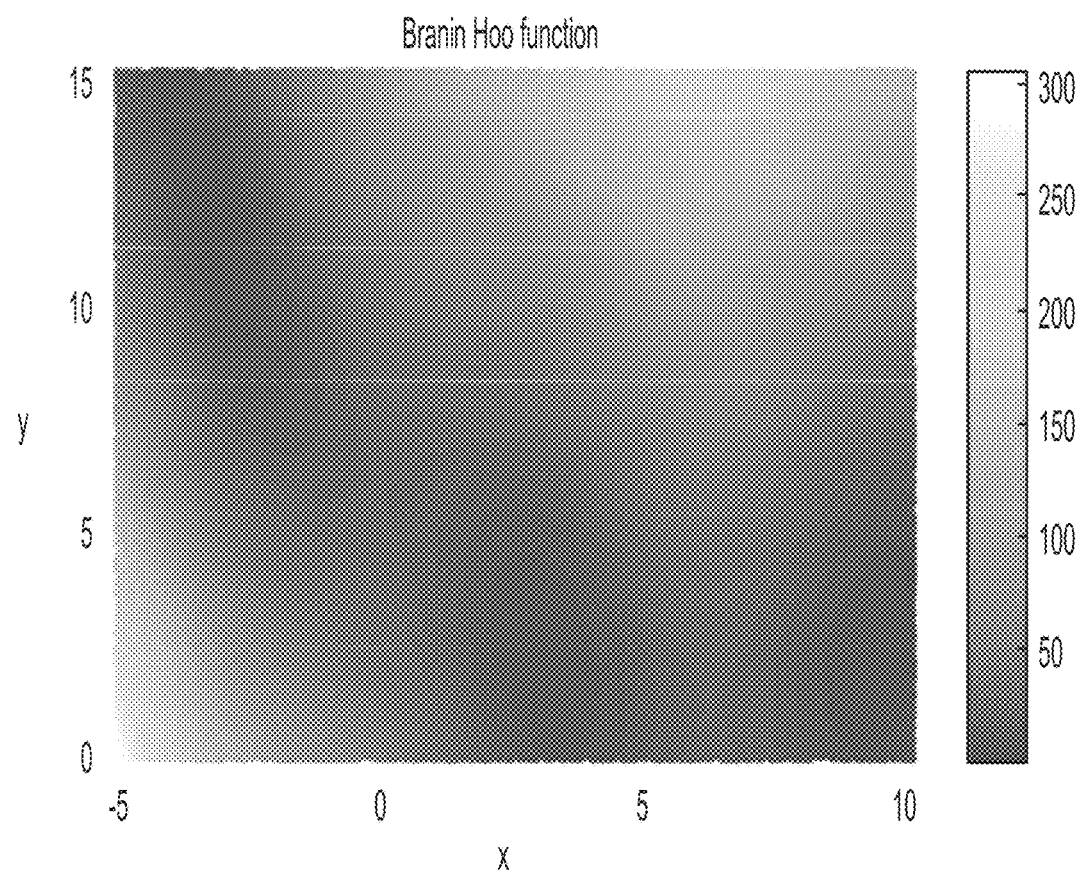
FIG. 3
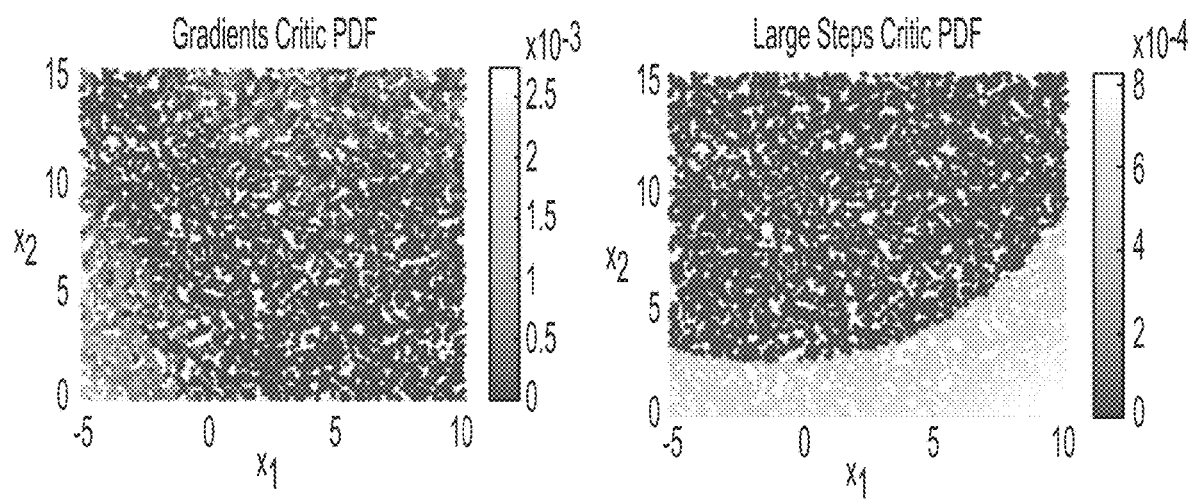
FIG. 4
FIG. 5

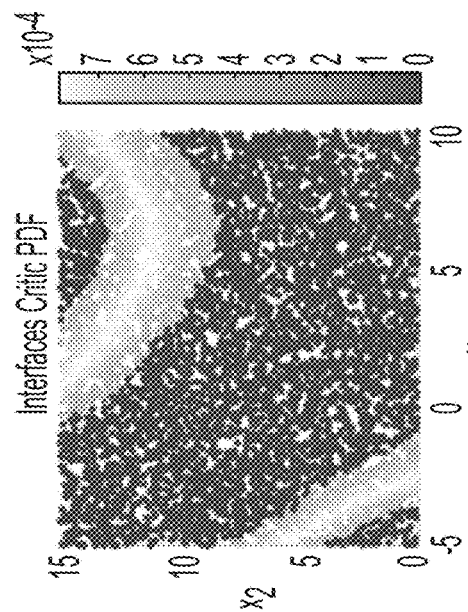
FIG. 6 Undersampled Critic PDF
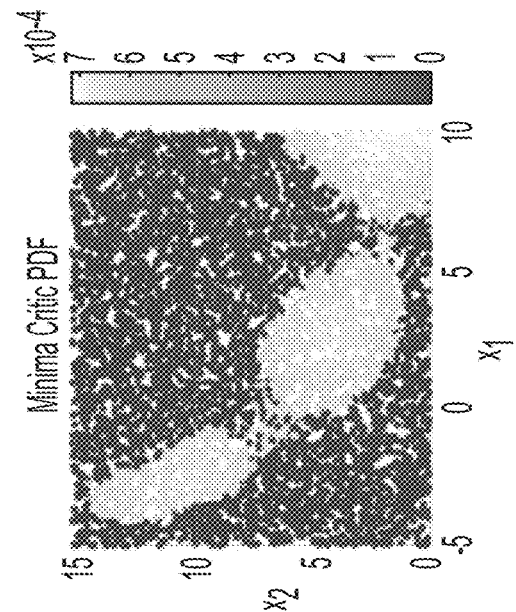
FIG. 7 Interfaces Critic PDF
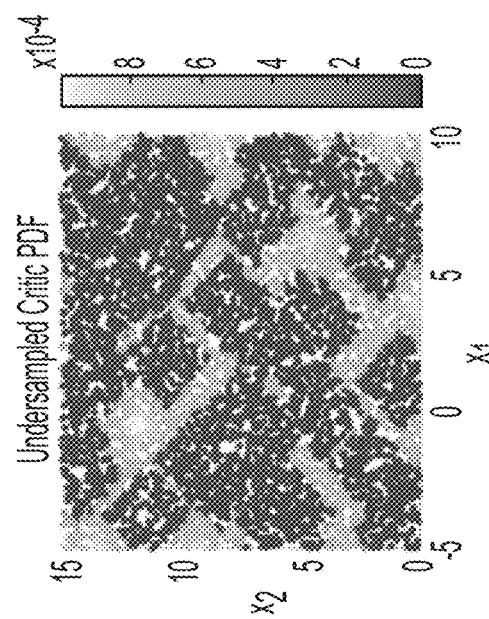
FIG. 8 Maxima Critic PDF
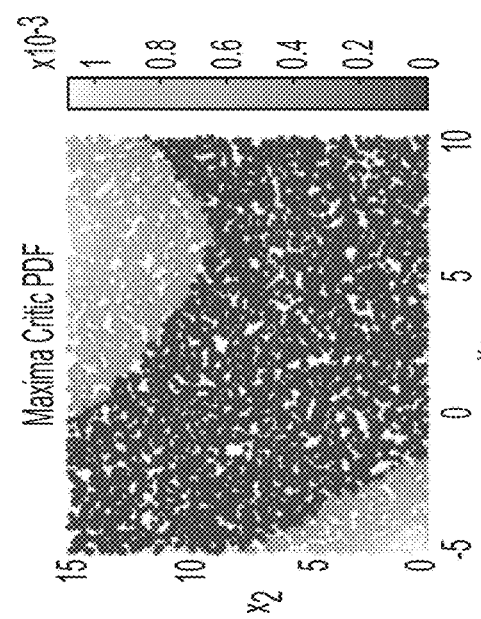
FIG. 9 Minima Critic PDF

METHOD AND APPARATUS FOR PROVIDING EFFICIENT TESTING OF SYSTEMS BY USING ARTIFICIAL INTELLIGENCE TOOLS

CROSS-REFERENCE TO RELATED APPLICATIONS

This application claims priority to and the benefit of co-pending U.S. Provisional Application No. 62/624,136 filed on Jan. 31, 2018, the entire contents of which are hereby incorporated herein by reference.

TECHNICAL FIELD

Example embodiments generally relate to techniques for evaluating modeling and simulation data or scenarios and, in particular, relate to apparatuses (and/or methods executable by configured apparatuses) that are capable of allowing an operator to interface with the evaluation process as it operates and further enables an output performance space to be searched to drive data generation on regions of interest to the operator.

BACKGROUND

Throughout the history of modeling and simulation (M&S), analysts have been tasked with deriving insight from complex parameter interactions within their tool suites. Due to the complexity of current numerical and multi-physical simulations, the computational cost associated with evaluating such simulations is exponentially increasing. This leads to exorbitantly long run-times and the inability to perform thorough exploratory and statistical analysis.

Currently, the need for understanding complex parameter relationships coupled with computationally expensive simulations yields an unfortunate tradeoff for analysts. The first option is to run a large number of computationally cheap low fidelity simulations to fill the input and output parameter spaces. This will generate a high confidence statistical understanding of how parameters interact within the space and subspaces. But this approach may introduce large uncertainties due to the nature of simulation fidelity. The second option is to run a small number of computationally expensive high fidelity simulations to get verifiable results. But sparse sample sets generally lead to gaps within the solution and provide a poor understanding of how parameters interact or insight into "edge" cases.

Adaptive sampling and active learning methods have started gaining traction in fields where there is insufficient data available or the cost of collecting data is excessive. Thus, an approach that implements learned concepts that seek to bridge the data availability gap by judiciously choosing parameter samples that ideally capture the most information from the simulation under test may be desirable. The methods and systems proposed here will show improvements that can be made to current parameter sampling approaches for higher dimensional complex systems.

BRIEF SUMMARY OF SOME EXAMPLES

Some example embodiments may enable the provision of a system that is capable of improving current parameter sampling approaches for higher dimensional complex systems.

In one example embodiment, an apparatus including processing circuitry configured to execute instructions that, when executed, cause the apparatus to perform various operations may be provided. The operations may include creating initial sample points based on a simulation received at the apparatus, and employing cyclic evaluation of the simulation until a stopping criteria is met. Employing the cyclic evaluation includes running the simulation at design points for a set of queries associated with a current iteration of the cyclic evaluation, training a set of meta-models of parameter space associated with the simulation for the current iteration, computing a set of metrics for the current iteration, and employing a selected sampling approach to select a new set of design points for a next iteration of the cyclic evaluation.

In another example embodiment, a method for testing artificial intelligence may be provided. The method may be executable via operation of configured processing circuitry. The method may include creating initial sample points based on a simulation received at the apparatus, and employing cyclic evaluation of the simulation until a stopping criteria is met. Employing the cyclic evaluation includes running the simulation at design points for a set of queries associated with a current iteration of the cyclic evaluation, training a set of meta-models of parameter space associated with the simulation for the current iteration, computing a set of metrics for the current iteration, and employing a selected sampling approach to select a new set of design points for a next iteration of the cyclic evaluation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a Branin-Hoo output solution having anomalous regions in the bottom left and top right in accordance with an example embodiment;

FIG. 4 illustrates a plot of data points considered for selection in X with shading indicating probability of selection in a sampling algorithm for a strategy searching for regions with a highest gradient in the solution space in accordance with an example embodiment;

FIG. 5 illustrates a plot of data points considered for selection in X with shading indicating probability of selection in a sampling algorithm for a strategy searching for regions near boundaries or edges of the domain in accordance with an example embodiment;

FIG. 6 illustrates a plot of data points considered for selection in X with shading indicating probability of selection in a sampling algorithm for a strategy searching for regions in the input space that are under sampled in accordance with an example embodiment;

FIG. 7 illustrates a plot of data points considered for selection in X with shading indicating probability of selection in a sampling algorithm for a strategy searching for regions that are interface regions or define boundaries between subspaces in accordance with an example embodiment;

FIG. 8 illustrates a plot of data points considered for selection in X with shading indicating probability of selection in a sampling algorithm for a strategy searching for maximum values in the output space in accordance with an example embodiment;

FIG. 9 illustrates a plot of data points considered for selection in X with shading indicating probability of selection in a sampling algorithm for a strategy searching for minimum values in the output space in accordance with an example embodiment;

DETAILED DESCRIPTION

Figure 1:
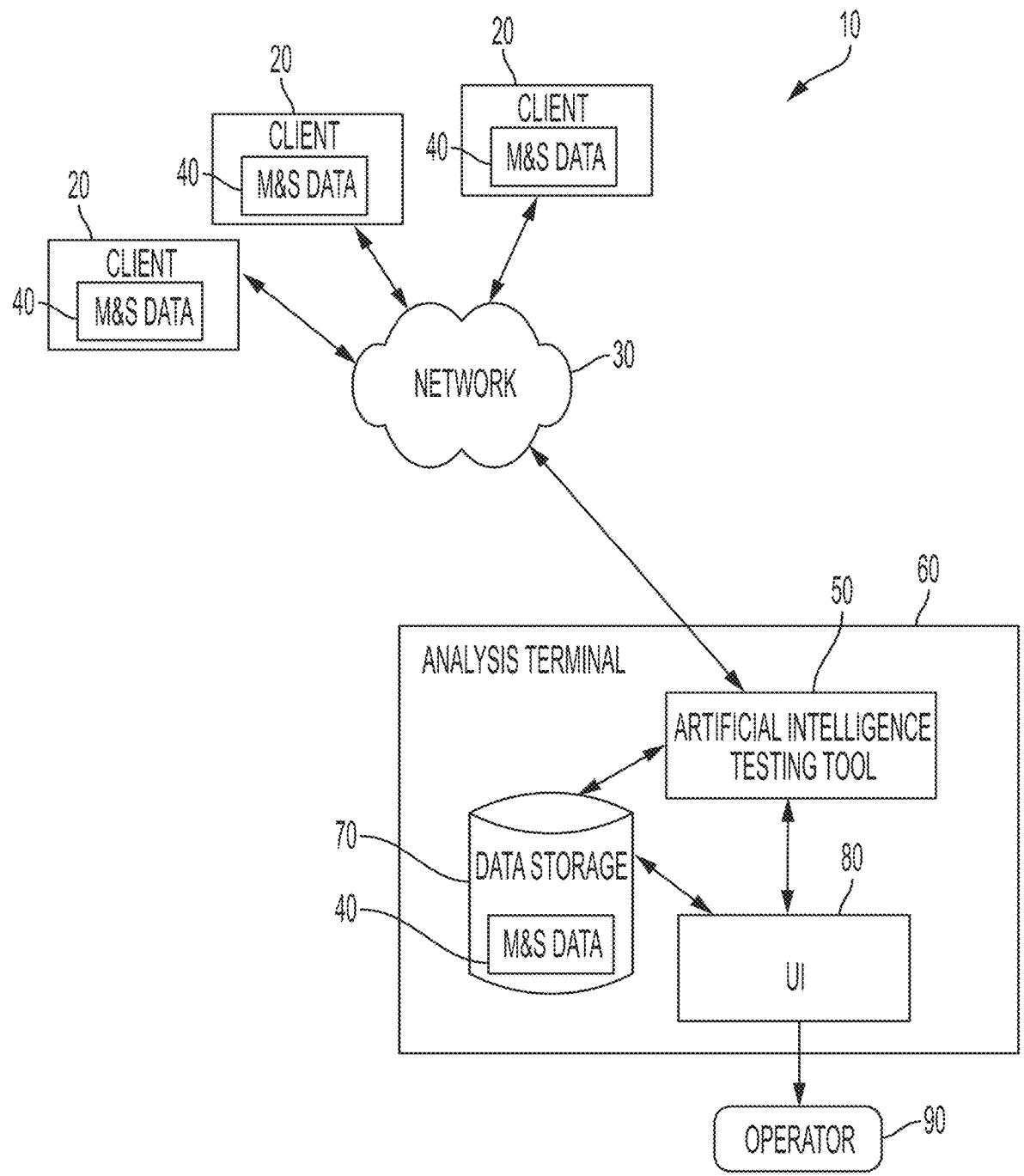
FIG. 1 illustrates a functional block diagram of a system that may be useful in connection with evaluating modeling and simulation scenarios according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As noted above, analysts traditionally follow a relatively rigid set of guidelines for setting up and running their analysis. Those guidelines include the following steps:

1. Identify a problem (business, engineering, etc.) to be solved with a specific question under observation.
2. Define scenarios related to the specified questions and identify how to test the scenario (simulation under test, experiment, etc.).
3. A priori establish the set of parameters ranges to be run and develop a case matrix to test the simulation or scenario via Design of Experiments (DOE) or similar methods.
4. Evaluate the simulation or scenario at the defined points in the case matrix.
5. Post-Process the results to form an understanding of the simulation under test.

The problems that are associated with this approach are numerous. For example, this approach requires all the data to be collected from the simulation before proceeding. For computationally complex high fidelity simulations, this could be time-restrictive. Additionally, anomalous regions in the solution space could be under-defined or represented based on the chosen DOE. Finally, due to the a priori nature of traditional sampling approaches, online and interactive analysis is difficult to perform.

Some methods currently exist and attempt to circumvent some of these issues including: screening designs, kriging and adaptive sampling. Additionally, similar frameworks have been proposed for purposes of farming high quality datasets. Unfortunately, the types of problems/simulations where these methods have shown the most benefit tend to be specifically tailored to their respective application. Thus, there remains a need to blend a number of different parameter sampling strategies, or develop a new strategy, such that generalization over many different problem spaces can be achieved and, regardless of the problem space, an efficient and effective result can be achieved.

In this regard, some example embodiments may relate to the provision of a system that is capable of efficiently and effectively exploring complex parameter relationships among simulations or scenarios. Thus, rather than utilizing massive amounts of resources to perform very large numbers of runs of the simulations or scenarios, example embodiments may cut (by orders of magnitude) the time and computation costs associated with high fidelity and complex analysis focusing on integrated simulations and scenarios. Insights into the parametric relationship space defined by the scenarios or simulations may be achieved more quickly, and with greater confidence. Thus, for example, the number of runs required in order to identify or resolve boundaries and rare event regions may be reduced relative to traditional discretization and DOE approaches.

Moreover, example embodiments may enable interactive data generation processes to occur with a human (i.e., an operator or analyst) in the loop. The operator can interact with the algorithms and influence the data generation process while the data generation process is being conducted to create a level of interactivity and augmentation not previously available in traditional methods. Example embodiments may also enable searching regions of interest in a simulation. In this regard, example embodiments provide the capability to search an output performance space to drive data generation on regions if interest to the operator. This means data is collected on regions or output performance of interest that may have complex relationships to the inputs. This ability is not only something an operator could not routinely do in traditional methods, but is further not something guaranteed to be intuitive to an operator, without leveraging machine learning technologies and the active/adaptive processes as described herein.

Example embodiments employ an analysis algorithm that points to or selects a next series of runs considering both local and global perspectives. Accordingly, an analyst who would otherwise need to wait for a very large number of runs to be completed in order to make judgments about regions of interest like boundaries and rare event regions may instead be able to see the algorithm steer each next run into a space that is more likely to resolve these regions of interest quickly. The regions will be resolved more quickly and, in some cases, the user can further interact with the operation of the analysis algorithm to steer the analysis to specific areas that may be of interest to the analyst. In other words, rather than simply executing a large number of runs randomly in order to find regions of interest, example embodiments steer next runs toward areas more likely to help define or locate the regions of interest.

The local and global perspectives mentioned above may be considered by virtue of defining certain objectives for the analysis. These objectives may include identification of regions, boundaries, relationships, and anomalous or rare spaces. If we consider the example of the familiar game of chess, the rules regarding how particular pieces move and the relationships to other pieces that are created by each movement may be examples of the perspectives that must be considered. For example, if a knight can take an opponent's queen, such move is generally a very positive move from the perspective of the knight. However, if doing so exposes the king, the move may be a negative move from the perspective of the king. Given that the game could be lost when the king is threatened, these perspectives may have different values or weights as well. Fusing multiple perspectives or views of the parameter space can lead to a better view of the overall space, and how parameters interact within it. Additionally, by adding feedback (e.g., via rewards), parameter samples that significantly improve the overall view may be perpetuated. Example embodiments may provide analysis tools aimed at enabling analysts to have high confidence and quality results in a smaller number of runs (e.g., if there is a time budget for analysis). Alternatively or additionally, if a given confidence level or target result (e.g., a stopping criteria or uncertainty minimization) is defined, example embodiments may reach the confidence level or target result in less runs and therefore less time.

An example embodiment of the invention will now be described in reference to FIG. 1. As shown in FIG. 1, a system 10 according to an example embodiment may include a plurality (and in many cases, a multitude) of client devices (e.g., clients 20). Notably, although FIG. 1 illustrates three clients 20, it should be appreciated that many more clients 20 may be included in some embodiments and thus, the three clients 20 of FIG. 1 are simply used to illustrate a potential for a multiplicity of clients 20 and the number of clients 20 is in no way limiting to other example embodiments. Example embodiments can also be practiced with fewer than three clients 20 and as little as one client 20. Moreover, in some cases, one or more of the clients 20 may connect to and disconnect from the system 10 at various times, so the population and specific identities of the clients 20 can change over time.

Each one of the clients 20 may include or otherwise be embodied as computing device (e.g., a computer, a network access terminal, a personal digital assistant (PDA), cellular phone, smart phone, or the like) capable of communication with or over a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 including, for example, the generation, consumption or sharing of various content items via the network 30.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, the clients 20 may be coupled via the network 30 in order to submit simulations and/or scenarios (e.g., M&S data 40) for analysis by an artificial intelligence testing tool 50 located at a device or entity (e.g., an analysis terminal 60) accessible via the network 30. In some cases, the analysis terminal 60 may include data storage 70 (e.g., a memory device) that may store one or more instances of M&S data 40. The M&S data 40 may be previously provided by one of the clients 20, or may be stored or otherwise provided to the data storage 70 by any means. As such, it should be appreciated that the artificial intelligence testing tool 50 may be configured to operate on either locally stored instances of the M&S data 40 or instances of the M&S data 40 that are provided by clients 20 that are remotely located relative to the analysis terminal 60. Thus, for example, the analysis terminal 60 could be a cloud based service accessible from anywhere in the network 30 to perform analysis on the M&S data 40 as described herein. The clients 20 could be service subscribers, or affiliates of a specific organization that operates the analysis terminal 60 and the artificial intelligence testing tool 50. However, in other cases, the clients 20 could be laptop computers or other terminals associated with individuals or groups within a particular organization, and the network 30 could be closed or otherwise have restricted access. In still other cases, the network 30 could be omitted entirely and the analysis terminal 60 may operate only on locally stored M&S data 40 at the data storage 70.

As shown in FIG. 1, the analysis terminal 60 (and/or the clients 20) may include a user interface 80 that is configured to enable an operator 90 to interface with the artificial intelligence testing tool 50 during the analytical processes described herein. The user interface 80 may be specifically associated with the analysis terminal 60. However, it should be appreciated that each of the clients 20 may also include an instance of a user interface that may also be used to enable an operator to interface therewith and to monitor and interact with the artificial intelligence testing tool 50 as described herein.

As will be described in greater detail below, the artificial intelligence testing tool 50 may be configured to perform interactive data generation processes with the operator 90 "in the loop." In other words, the operator 90 (or analyst) can interact with the algorithms executed by the artificial intelligence testing tool 50 and influence the data generation process while the data generation process is being conducted. The artificial intelligence testing tool 50 may also be configured to search regions of interest in a simulation under test (i.e., M&S data 40). Thus, for example, an output performance space can be searched to drive data generation on regions of interest to the operator 90. This means the operator 90 can collect data on regions or output performance of interest that may have complex relationships to the inputs. Having this ability is not something an analyst could routinely do in traditional methods, and generally would not be intuitive to an analyst without leveraging machine learning technologies and the active/adaptive processes as described herein.

As noted above, the artificial intelligence testing tool 50 may be configured to provide improvements to current parameter sampling approaches for higher dimensional complex systems. In this regard, the artificial intelligence testing tool 50 may define a framework for operation that is quite different than traditional DOEs. The framework may more efficiently and intelligently derive insights from a suite of M&S tools. Specifically, the framework may facilitate interactive data generation and exploration with informative metrics for analyst evaluation of the data. Based on this paradigm, a general approach can be formulated.

There are two parameter spaces that are important to consider including 1) the input ($x \in X$) space and output (($x) \in G$) space. The relationship between x and (x) is the simulation or system under test (G), which is one specific example of the M&S data 40. In the context of some examples, it may be assumed that G is cost-prohibitive to evaluate. Accordingly, to reduce the cost associated with G, use may be made of a surrogate or meta-model (($x) \approx (x)$). The meta-models used for example embodiments may be general in nature and not limited to specific input and output data types.

Using the variables outlined above, an iterative approach for sampling the input parameter space may be set up to better understand the output space and the corresponding relationships. The following steps may then be looped over for a predefined number of iterations. In this regard, for all i,
1. Run the simulation, G, for a set of sample points in X, to define the dataset pair ($x_i$, $G(x_i)$).
2. Use (xi, (xi)) to train a meta-model that represents G.
3. Extract a set of predefined metrics on F that can be used to form a better understanding of G.
4. With the computed metrics and meta-models, intelligently select sample points that will maximize the understanding of G.

Figure 2:
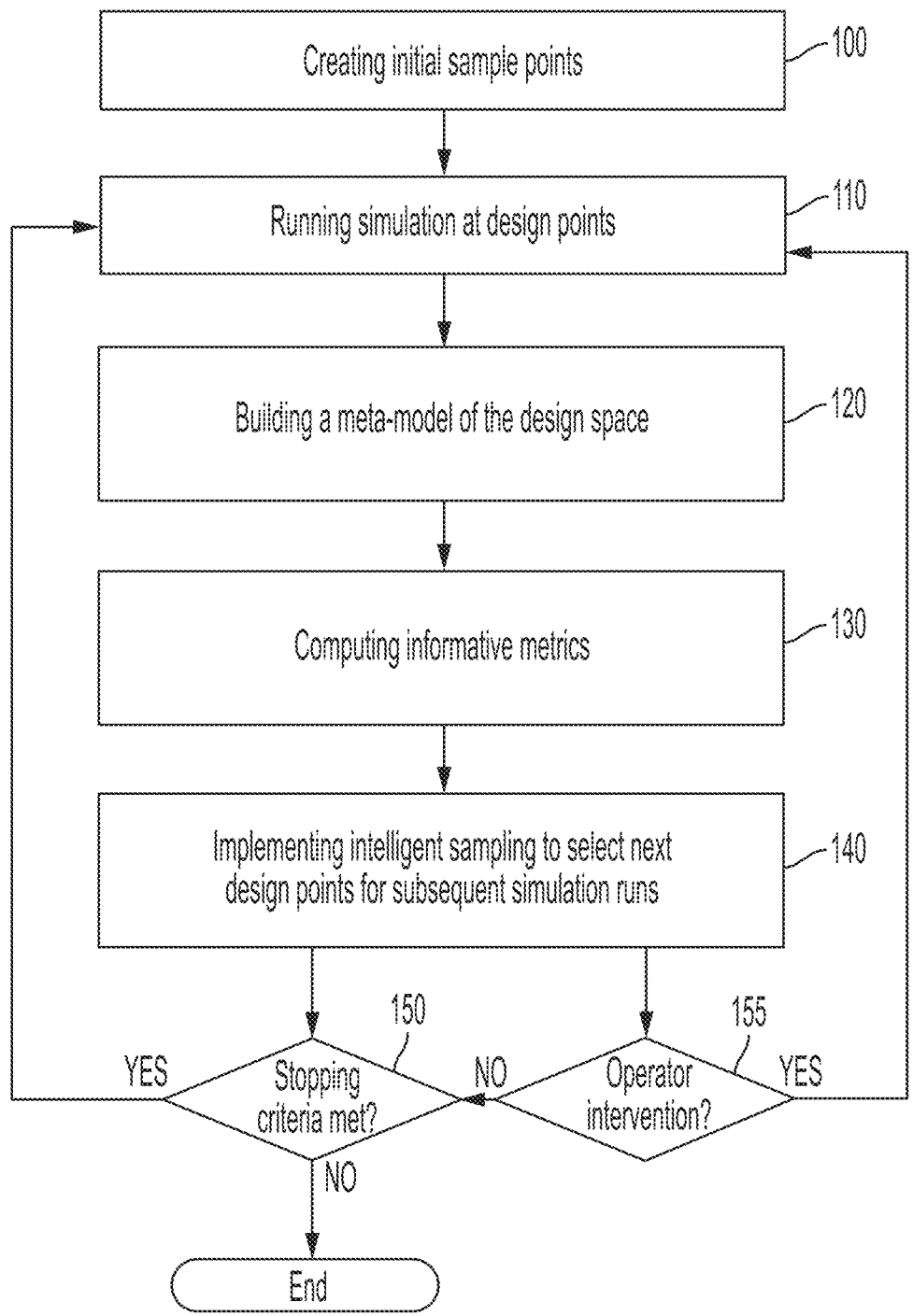
FIG. 2 illustrates a functional block diagram of a method of evaluating modeling and simulation scenarios according to an example embodiment.
Figure 11:
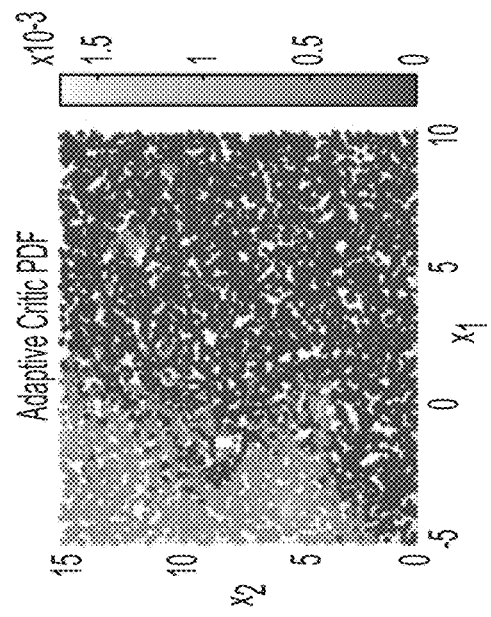
FIG. 11 illustrates a plot of data points considered for selection in X with shading indicating probability of selection in a sampling algorithm for a strategy searching for regions that provide the most "surprise" in accordance with an example embodiment.
Figure 13:
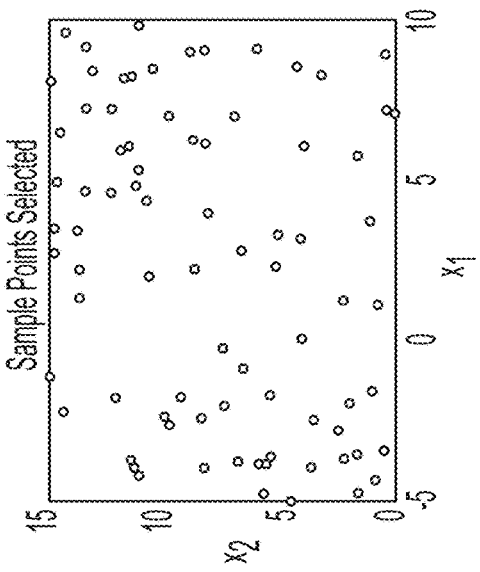
FIG. 13 illustrates a plot of sample points selected using the point selection algorithm (80 total points) in accordance with an example embodiment.
Figure 10:
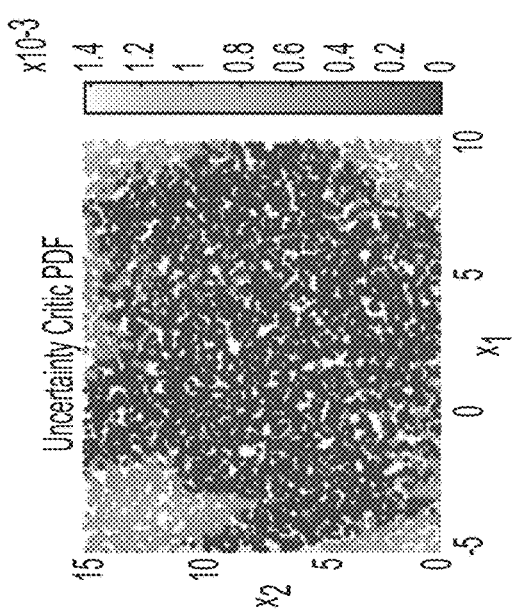
FIG. 10 illustrates a plot of data points considered for selection in X with shading indicating probability of selection in a sampling algorithm for a strategy searching for data points with the highest predictive uncertainty in accordance with an example embodiment.

This process, which may be performed by the artificial intelligence testing tool 50 on M&S data 40 from any source, is demonstrated in FIG. 2. In this regard, as shown in FIG. 2, the process may include an initial operation 100 of creating initial sample points based on a simulation (e.g., M&S data 40) received at the artificial intelligence testing tool 50. The simulation may then be run at design points at operation 110. In this regard, the simulation may be run for every query and the output may be stored locally at the artificial intelligence testing tool 50. Meta-models of the design space may then be built (or trained) at operation 120. The meta-models may be generated using an ensemble approach that helps define a better understanding of the parameter space associated with the M&S data 40. In this regard, using the data available from the stored output of the running of the simulation, the artificial intelligence testing tool 50 may train the ensemble meta-model approximation of the parameter space. Thereafter, informative metrics may be computed at operation 130. Intelligent sampling approaches may then be implemented to select next design points at operation 140. At operation 150, a determination may be made as to whether a stopping criteria is met. If the stopping criteria is not met, then the process may loop from operation 110 to operation 140 until the stopping criteria is met. As noted above, the stopping criteria may include achieving a given confidence level or target result, or minimization of uncertainty. Alternatively or additionally, a determination may be made as to whether the operator has intervened (e.g., via the user interface 80) at operation 155. If the operator has intervened, any changes made to operations 110-140 may be made in accordance with the operator's instructions, and the process may loop from operation 110 to operation 140 based on those changes. If no changes have been made, the process may proceed to operation 150 to determine whether the stopping criteria have been met.

The building of the meta-models (i.e., at operation 120) may, for subsequent loops through the method, include sub-operations such as computing error with respect to data partitions and the individual meta-models between the previous iteration (or iterations) and the current iteration. This error computation may be informative to the user (e.g., viewing operation of the method via the user interface 80), and may also be used to determine whether to keep or eliminate some meta-models for subsequent iterations. In some cases, the error calculation may include an ensemble error, which may include errors associated with the entire ensemble approximation and/or sampling, computed for each of the data partitions. For a specific iteration, the ensemble error should be a scalar value. The error computation may also include an individual error, which may include errors associated with an individual one of the meta-models computed for each of the data partitions. For a specific iteration, errors may be stored in a vector that may be the same size as the number of individual meta-models specified by the user.

As noted above, in some cases, a determination may be made as to whether to keep or eliminate some meta-models for subsequent iterations. In an example embodiment, decisions whether to keep or eliminate meta-models may be made based on only the individual error calculated above. In this regard, if the individual error for a particular one of the meta-models is above a threshold, then the particular meta-model may be eliminated from use in subsequent iterations. The user interface 80 may present information to the operator 90 to enable the operator 90 to view the error and make decisions (like keeping or eliminating individual meta-models) based on the information. In some cases, the operator 90 may also be enabled to define specific requirements or constraints on output predictions via the user interface 80.

In some cases, the computation of metrics (i.e., at operation 130) may also include sub-operations. In this regard, for example, the metrics computed may be stored and presented to the operator 90 via the user interface 80. Some example metrics that may be calculated may include a Mahalanobis distance, a global sensitivity, a maximum likelihood expectation (MLE), Fisher information, gini coefficient, principal components analysis (PCA), precision and recall metrics, and entropy.

The Mahalanobis distance may be a statistical distance to measure how much the parameter space changes with respect to iteration. The metric may be computer for each output and may include the computed mean and standard deviation of each new output data point compared to the distribution of the previous iteration. If the output is categorical, the Mahalanobis metric may be computed with respect to the distribution of input parameters in each category. The global sensitivity metric may illustrate to the operator 90 how much influence each of the input parameters has on the outputs. The global sensitivity metric may be computed using a variance based approach to derive parameter importance (e.g., the Sobol method). Global sensitivity analyses can be used by an analyst to trim down the parameter design space for focused analysis. The MLE metric may provide guidance on what is the most likely output parameter value. MLE may be useful for getting insight into what the output parameter space might look like, and may be helpful for computing the Fisher information metric, which is the response surface curvature at the MLE value. The Fisher information matrix may measure how much importance each of the output parameters has on the overall response, and how much each of the output parameters is related to other output parameters. The gini coefficient may measure the disparity of the distribution in the output parameter space. If an output has a wildly disparate and anomalous response, the gini coefficient may be large. The PCA computes the decomposed orthogonal projections of the data space and the driving modes within the input/output parameter space. Precision and recall are metrics are typically applied to classification problems as a means by which to show how well a classifier performs. The metrics relate the type I and type II errors (i.e., false positives and false negatives, respectively) to the correct classification set. The metric may only be computed on categorical output parameters. Entropy provides a level of surprise as data is added to the systems. A well characterized parameter space should have a low level of entropy associated therewith.

In some cases, additional metrics that may be computed and stored to influence the algorithm as well as provide insight to the operator 90 may include local sensitivity, uncertainty and feature assessment criteria (FAC) function weights (or FAC weights). The local sensitivity may refer to the solution gradient, and provide the gradient of each output with respect to the input at a specific point in the design space. The local sensitivity metric may use a finite difference approach to compute the first order derivative of the output with respect to the input. Computing local sensitivity may produce a matrix like the global sensitivity, except that the local sensitivity is for a specific point in the design space as opposed to the full space. The local sensitivity may not be stored as it is computationally costly to evaluate. Thus, the local sensitivity may simply be called as needed by the algorithm, but not otherwise stored. The uncertainty metric may refer to the amount of disagreement between individual meta-models for a specific point in the design space. Ideally, the metric may represent regions where there is a lot of information yet to be learned. For every iteration, the meta-model uncertainty may be computed with respect to the training data points that have been run through the simulation. Additionally, the uncertainty may be standardized with respect to its mean and standard deviation to enable outliers to quickly be identified. The FAC weightings may be a derived metric that relates to the operator 90 the focus of a particular algorithm. For example, some algorithms may focus more on (and be better at finding) steep gradients, uncertainties, interfaces, etc. Thus, higher weights may indicate that the algorithm has determined the corresponding features to be most relevant for a given design space.

The focus of the operation of the artificial intelligence testing tool 50 may therefore be to provide clarity on how an optimal set of parameter samples from X can be selected for evaluation in G. But it is important to note the approach that was used to generate F as an approximation to G. For this approach, an ensemble of meta-models (e.g., "weak-learners") whose objective is to get a general rough understanding of G given (xi, (xi)) at a reduced computational cost may be employed, as mentioned above. When constructing a meta-model, fine tuning of hyper parameters may be necessary to produce the most precise approximation of the space. Since the objective for this framework is to iteratively generate the most informative data, reliance on optimal meta-model construction may be avoided.

In some example embodiments, the ensemble of meta-models may include Artificial Neural Networks, Generalized Linear Models, Gaussian Processes, Support Vector Machines, Random Forests, Decision Trees, etc. These individual meta-models may be used in an ensemble approach defined by the WTA3 technique, using $\alpha=0.001$ and $\beta=-3$. Ensembles may be useful for a set of weak-learners because certain meta-models are more suited to approximate G than others in corresponding different situations. For example, for nonlinear and discontinuous relationships, some meta-models may perform better than others. Thus, given that the objective is to create a fast rough estimate of the input and output parameter relationships associated with the M&S data 40, a relatively small amount of energy can be placed into trying to derive the best possible model, since the ensemble of models will provide results from each of a number of models that may have differing levels of suitability or advantage to any given data set associated with the M&S data 40. This process can also be done in an iterative manner such that the meta-models are continually re-trained and re-weighted so that the meta-models more suited to the particular problem at hand (e.g., the new data points generated by the previous iteration and added to the existing pool of data) end up being distinguished and are given priority.

Another aspect of the framework defined by the artificial intelligence testing tool 50 is the metrics that are computed to describe the relationships and characteristics of the M&S data 40. In general, there are two classes of metrics that may be computed within the approach defined by the artificial intelligence testing tool 50. The two classes may include metrics intended for an analyst to assess data quality and metrics needed by the point selection algorithm to choose informative parameter samples. In the context of example embodiments, sensitivity may be understood to refer to the amount of influence that a single input parameter has on the output response parameter. When quantifying this metric (i.e., sensitivity) over the entire input/output parameter space, it may be referred to as global sensitivity analysis. Local sensitivity may therefore be understood to refer to the input/output relationship at a defined point in the input parameter space. Specifically, this reduces to the partial derivative of the output parameter with respect to the input parameter of equation (1) below:

$$S(x) = \frac{\partial G(x)}{\partial x} \quad (1)$$

for all inputs and all outputs. To compute the local sensitivity, a number of methods could be implemented including: generic automated differentiation or a finite difference like approach. The results presented in this example implement a finite difference approach to compute the local sensitivity due to their ease of implementation and general popularity in the field.

Uncertainty quantification is a field in and of itself, with a number of different application areas and approaches associated with it. For the purposes of this disclosure, a specific implementation of uncertainty referred to as modeling uncertainty may be employed. In the context of modeling uncertainty, one way to quantify the uncertainty of a prediction ((x)), is to measure the disagreement between the ensemble of meta-models. The uncertainty measure may be shown by equation (2) below:

$$U(x) = \sqrt{\frac{\sum_{i=1}^{N_{SM}} (F_i(x) - \overline{F}(x))^2}{N_{SM} - 1}} \quad (2)$$

where $N_{SM}$ refers to the number of meta models included in the ensemble and $\bar{F}(x)$ denotes the average meta-model solution.

Given the meta-model approximation of G as well the metrics at hand, the next step is to define a parameter sampling algorithm. In an example embodiment, a point selection algorithm may be employed that is derived from active learning and adaptive sampling concepts that iteratively update the criterion controlling which parameter samples to select.

A query may be considered an individual sample point that is allowed to be drawn from the entire input domain, X. The goal of each query is to iteratively find a parameter sample that maximizes the understanding of a predefined simulation under test. Other than the simulation and domain (X and G) definitions, the only other constraint placed on each query is that the query generally cannot select a parameter sample that has already been tested, except for Monte Carlo replicates. Due to the lack of constraints inherent in this problem, the complexity associated with learning intelligent sampling strategies is quite difficult. Hereinafter, individual queries will be referred to as $x_i$, where i represents the iteration and a defines the unique sample point per iteration. Differentiating between samples with respect to iteration will be necessary for the local parameter sampling mechanism that will be discussed later.

In active learning, there is the understanding of an unlabeled pool of data that represents all possibilities of input combinations. This set of all possible input parameter combinations to a simulation may be referred to as the query pool. To generate the query pool, a discrete representation of the space X, referred to now as X*, that attempts to capture all possible parameter combinations between input parameters in X, may be defined. In an ideal situation, every single possible point in X* could be evaluated. However, in practice, this magnitude of evaluation load is computationally prohibitive. To reduce the computational complexity, example embodiments uniformly down-sample from X* so that metrics needed for each individual query can be efficiently calculated. The pool available to a given query is noted as: $X_{i,a}^*$ (comprised of $x_{i,a}^* \in X_{i,a}^*$) with consistent subscripts as the individual queries. The next set of parameter samples to be run through the simulation G will be generated by the artificial intelligence testing tool 50 from this query pool. To select the optimal parameter samples, a set of FAC functions may be employed.

The FAC functions (or simply "FACs") may be individual discrete probability mass functions (pmf's) that provide a mapping between the query pool ($X_{i,a}^*$) and the probability of selecting that given query (($\pi_j(x_{i,a}^*)$, refers to each of the individual FACs). In some cases, the FACs may alternatively be referred to as (or may be considered to alternatively be considered to be defined as) feature space assessment criteria.

Some examples of FAC functions may include: meta-model uncertainty, gradients (e.g., local sensitivity) and under-sampled regions. One objective of the framework provided by the artificial intelligence testing tool 50 is to be modular in nature so that users can implement FAC functions of their own choosing during operation, if the need arises. In some examples, the FAC functions are useful for capturing and quantifying the general major features in a parameter space. Table 1 below documents eight example FAC functions along with a description and governing equation for each one.

TABLE 1

| FAC | Description | Governing equation |
|---|---|---|
| Under-sampled | Assign high probability to regions where there are not any existing sample points ($\vec{x}^*$). | $\pi_j(x_{i,a}^*) = \max(|x_{i,a}^* - X_{i,a}^*|_2)$ |
| Gradients | Queries with large gradients in the solution space are weighted highest. | $\pi_j(x_{i,a}^*) = \max\left(\frac{\partial F(x_{i,a}^*)}{\partial x_{i,a}^*}\right)$ |
| Interfaces | Attempt to sample regions with the median (med(x)) value of an output parameter. | $\pi_j(x_{i,a}^*) = \min(|F(x_{i,a}^*) - \text{med}(F(\pi_{a,i}))|)$ |
| Boundaries | Focus on the boundaries of the input domain. This is computed by looking for queries with large distances to the mean (E(x)) | $\pi_j(x_{i,a}^*) = \max(|x_{i,a}^* - E(x_{i,a}^*)|_2)$ |
| Minima | Look for the minimum values for a defined output. | $\pi_j(x_{i,a}^*) = \min(F(x_{i,a}^*))$ |
| Maxima | Look for the maximum values for a defined output. | $\pi_j(x_{i,a}^*) = \max(F(x_{i,a}^*))$ |
| Uncertainty | Assign high probability to regions where there is the most disagreement in the meta models. | $\pi_j(x_{i,a}^*) = \max(U(x_{i,a}^*))$ U is defined in equation (2) |
| Adaptive | Fit a model ($Z(\pi_{a,i})$) to find the largest residuals in the meta-models solution | $\pi_j(x_{i,a}^*) = \max(Z(x_{i,a}^*))$ with $Z(\pi_{a,i}) \approx |G(x_{i,a}^*) - F(x_{i,a}^*)|$ |

Once a set of possible queries ($x_{i,a}^*$) is achieved, and their associated probability of selection, (($\pi_j(x_{i,a}^*)$), is also known, the next step is choosing the next set of sample points. A point selection algorithm may be employed for selection of the next set of sample points. In an example embodiment, the point selection algorithm may employ the definition of: the queries, their associated query pool (or pool of queries) and the probability of selection to define an approach that iteratively seeks to pull out the most important parameter sample from the pool of queries. In some embodiments, the artificial intelligence testing tool 50 may be configured to employ a set of weightings that are iteratively updated and applied to the individual FAC functions so that FAC functions that map advantageous sampling strategies are weighted higher. The selection equation can be written as a random draw from the joint probability mass function, $p(\pi_j)$, of the weighted sum of FAC pmf's as shown in equation (3) below:

$$p(x_{i,a}^*) = \sum_{j=1}^{N_c} \rho_{i,j,a} \pi_j(x_{i,a}^*) \quad (3)$$

for all queries, where Nc represents the number of FAC functions and $\rho_{i,j,a}$ are the FAC weightings at that iteration. The FAC weightings, $\rho_{i,j,a}$'s, are normalized for every iteration such that $\Sigma_j \rho_{i,j,a} = 1$. It should be noted that the weightings associated with each FAC function can be computed in a local or global manner. The local weightings (shown in this example) imply that values of $\rho$ are computed and stored for every iteration, FAC function and query. Global weightings on the other hand, assume that weights are shared among queries ($\rho_{i,j}$ terms only). Example embodiments may present a local approach, but further include the possibility of extension to a global approach. In general, initialization of the FAC function weightings ($\rho$'s) is not known a priori. Thus, all FAC function weightings may initially be set to equality. If, for a particular situation, subject matter expertise exists, then the expertise can also be accounted for by adjusting FAC weights or focusing on regions of interest. Using this joint pmf, a method to iteratively update the FAC function weights for more intelligent parameter sample selection may be sought.

With the ability to iteratively generate data, measuring the change in belief of a meta-model approximation may also become possible via a predefined global metric. This predefined global metric may influence how much a given set of parameter samples affected the understanding of the simulation space and may be used to update the FAC function weightings. Ideally, it may be desirable to capture queries that dramatically change the understanding of the output space and propagate them to the individual p values. In this manner, FAC functions that provide the most input will be weighted higher than FAC functions that do not.

By iteratively adjusting the FAC weights, the joint pmf $(p(x_{i,a}^*))$ will optimally weight queries that reflect the best search criteria. The question then becomes, how to determine how the magnitude in which FAC weightings should be updated and how to propagate this to the individual FAC functions. We will now propose an update method that attempts to capture information between iterative parameter samples to optimally weight our FAC functions.

In this regard, a metric may initially be defined that enables capture of the change in belief of the meta-model approximation between iterations. This metric $(\eta(x_{i,a}^*))$ relies on information from the current iteration, i, and the previous iteration, (i−1). Specifically, the expected value of the query $(F_{i-1}(x_{i,a}^*))$ and their associated predictive uncertainty $(U_{i-1}(x_{i,a}^*))$ as well as the true simulation output, $G(x_{i,a}^*)$. Using this information, the term $\eta(x_{i,a}^*)$ can be defined as shown in equation (4) below:

$$\eta_{i-1}(x_{i,a}^*) = \left\| \frac{G(x_{i,a}^*) - (Fi - 1(x_{i,a}^*))}{(Ui - 1(x_{i,a}^*))} \right\| \quad (4)$$

where $\|\cdot\|$ references Euclidean vector norm. For the global case, $\|\cdot\|$, remains the Euclidean vector norm with respect to the queries. Using this method, one can determine an appropriate step size (e.g., indicating an amount of FAC weight updating or change in weight) to assign to FAC functions that produce the most information about a system under test.

Propagation of $\eta$ is necessary to influence the FAC function weightings in order to inform current and future sampling. The objective of this step is to generate a map $(L_j(x_{i,a}^*))$ that relates $\eta_{i-1}(x_{i,a}^*)$ to the FAC functions that provided the most informative input. Recall that $p(x_{i,a}^*)$ is a joint probability mass function made up of a linear combination of individual FAC pmf's $(\pi_j(x_{i,a}^*))$ and their associated weights $(\rho_{i,j,a})$. Thus, there is a probability of selecting any possible query, $(x_{i,a}^*)$, with respect to each of the individual FAC functions. So it would be sufficient to write this mapping function as shown in equation (5) below:

$$L_j(x_{i,a}^*) = \frac{\pi_j(x_{i,a}^*)}{\sum_{j=1}^{N_c} \pi_j(x_{i,a}^*)}. \quad (5)$$

That is to say that the probability associated with selecting $(x_{i,a}^*)$ with respect to FAC function j is the individual probability of FAC function j at iteration (i−1). It is important to note that this probability is computed independent of the FAC weightings, which guards against over dependence of these weightings. The global approach keeps the same function.

The end goal is to produce FAC function weights that favor the individual FAC functions that provide the most information about how to sample the parameter space. Using the step size and mapping functions, a simple weight update method may be defined to iteratively refine the FAC weightings as shown in equation (6) below:

$$\rho_{i,j,a} = \rho_{i-1,j,a} + \eta_{i-1}(x_{i,a}^*)L_j(x_{i,a}^*) \quad (6)$$

for all iterations (i), FAC functions (j) and queries (a).

Recall that this update can be done in two senses: global and local. If the strict definition is followed in the preceding equations, the logic will form a local set of FAC function weightings. That is to say that each individual weighting is specific to the individual queries. If the goal is to share information across all queries, a global approach may be more accurate. One method for computing a global FAC function update is to sum the updates for each query as shown in equation (7) below:

$$\rho_{i,j} = \rho_{i-1,j} + \sum_{a=1}^{N_a} \eta_{i-1}(x_{i,a}^*)L_j(x_{i,a}^*) \quad (7)$$

where $N_a$ represents the total number of queries per iteration. Results for both of these approaches will be described herein.

In some examples, by iteratively updating the weight values, one can "learn" what the most important features (described by the FAC functions in Table 1) define the simulation. By iteratively refining these weight values, the most descriptive parameter samples can be used to generate the best understanding the simulation space.

To demonstrate how this approach works in comparison to traditional sampling methods, a case study on a simple three-dimensional test problem (two inputs, one output) will be illustrated. The problem of interest is called the Branin-Hoo equation, which is a response-surface problem typically used for testing optimization methods. In practice, this approach would be most suited for a complex simulation with many parameter inputs and outputs that takes a long time to execute. But for purposes of this example, it will be used to provide visuals and convergence results for how the point-selection algorithm performs on a simple test. Examples on how the problem is defined, implemented and analyzed will be presented to illustrate the process and results in comparison with traditional sampling methods.

The Branin-Hoo function takes two input parameters ($x_1$ and $x_2$) and maps them to a defined response $((x_1, x_2))$. FIG. 3, to which equation (8) correlates, shows the response surface of the Branin-Hoo function with respect to the input parameters. Both $x_1$ and $x_2$ are assumed to be uniformly distributed across the design space.

$$G(x_1, x_2) = \left(x_2 - \frac{5.1x_1^2}{4\pi^2} + \frac{5x_1}{\pi} - 6\right)^2 + 10\left(1 - \frac{1}{8\pi}\right)\cos(x_1) + 10 \quad (8)$$

with $x_1 \in [-5,10]$ and $x_2 \in [0,15]$

Using the defined parameter space of the Branin-Hoo function, a comparison may be made between example embodiments and traditional DOE approaches to show a proof of concept for performing more intelligent sampling approaches. Additionally, nonlinear meta-modeling algorithms can be considered overkill for a problem such as this.

Before analyzing the results of sampling according to example embodiments, it may be useful to visualize some parts of the point selection algorithm process. Specifically, it may be desirable to elicit insight into what an algorithm of an example embodiment determines to be most important when selecting sample points from the design space.

Given the definition of the FAC functions presented in Table 1, it is possible to plot the probability of selecting any given point in the design space like for each individual FAC function. FIGS. 4-13 show each of the FAC functions applied to the Branin-Hoo problem after 40 sample points have been selected eliciting the probability of selecting a given point in the design space. With 40 sample points already selected, features are generally recognizable in the context of the Branin-Hoo problem. The plotted data points refer to the set of possibilities under consideration by the sampling method, while the color represents the probability of selection. From this figure it is clear to see that FAC functions like the maxima (see FIG. 8) want to sample regions where there are large output values (bottom right and top left). Whereas other FACs like the undersampled FAC function (see FIG. 6) assign large probability values to regions that are spaced further apart from previously sampled data points.

Figure 12:
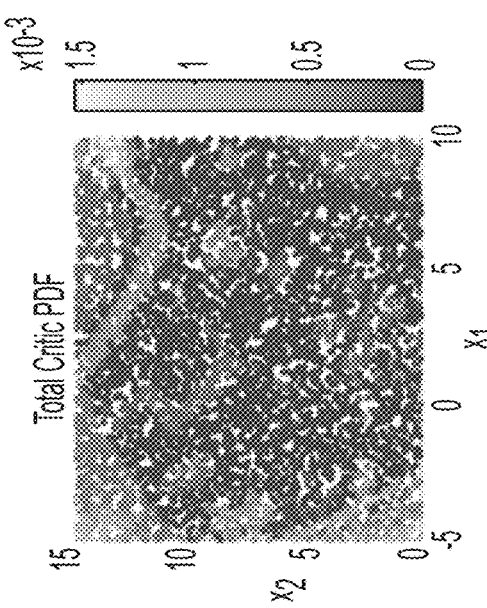
FIG. 12 illustrates a plot of a total feature assessment criteria (FAC) function combining individual functions with their associated weights after selecting 80 total sample points in accordance with an example embodiment.

Combining the FAC functions and weightings (iteratively updated using equations (6) and (7)), it is possible to generate the combined point selection probability given a set of possible design points. FIG. 12 shows this combined total pmf as a function of the individual pmf's and their associated weights. By cross referencing FIG. 12 and FIG. 3, it appears that some of the defining features of the Branin-Hoo function are represented in the total pmf. FIG. 12 shows the 80 sample points that have been drawn from the constructed total FAC pmf throughout all the iterations. It can therefore be observed that there is a large concentration of data points in the anomalous regions that were previously mentioned.

Figure 14:
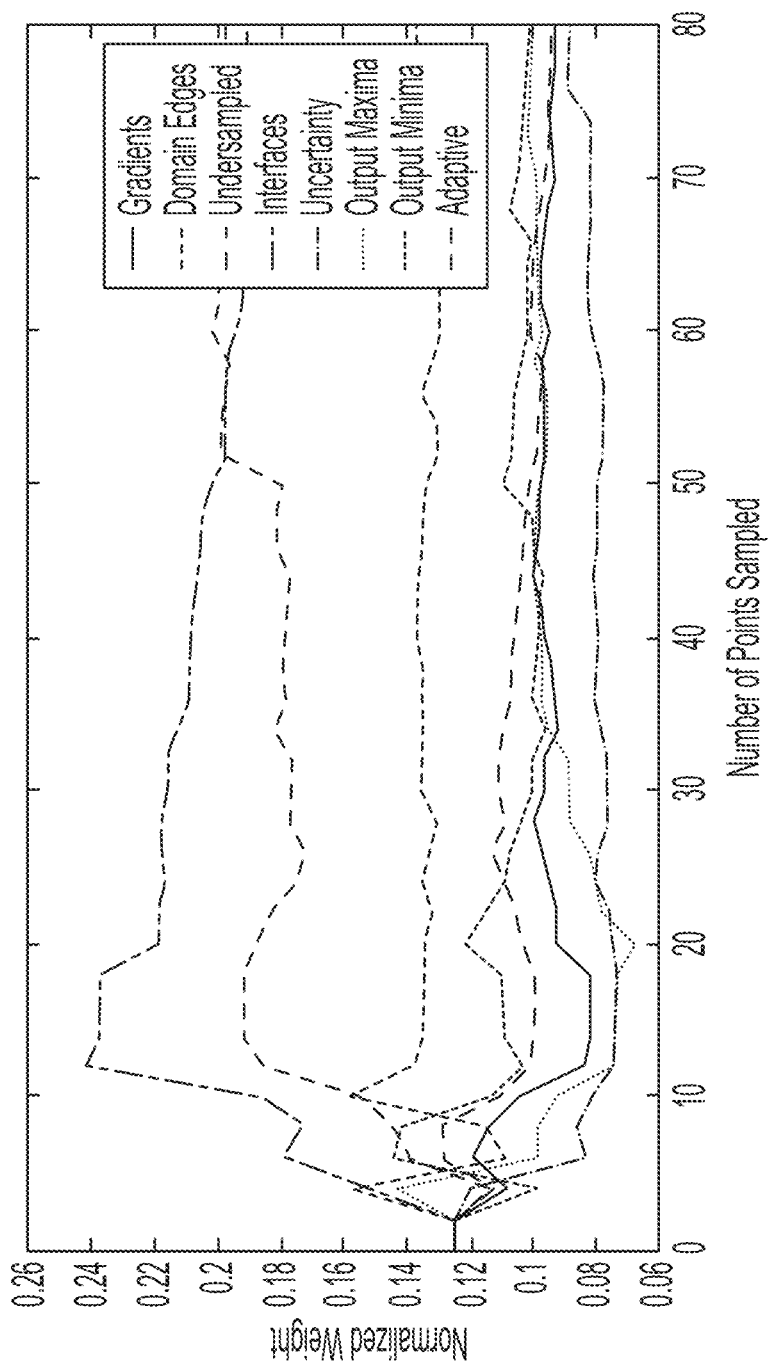
FIG. 14 illustrates a graph demonstrating how FAC weightings as additional data is sampled in the design space in accordance with an example embodiment.

The graph of FIG. 14 shows the evolution of the FAC function weightings as more data is sampled. It appears that in this instance, the interfaces FAC function seems to have the highest weighting among the set of FACs which means that the algorithm is attempting to characterize the transition regions. These FAC weightings and their associated defining functions provide an additional "derived" metric that can be used by an analyst to get a better understanding of the underlying features and characteristics of the problem space.

To assess how well this approach compares to traditional sampling methods, it is useful to define a metric that allows for a fair comparison between approaches. For this problem, the Root Mean Square (RMS) error was computed by evaluating the difference between the true function value and the predicted meta-model approximation for all possible points in the design space. The set of meta-models generated using the intelligent parameter sampling method may be compared against three traditional design of experiment methods: Latin Hypercube Sampling (LHS), Uniform and generic random sampling. Each of the parameter sampling approaches used the same set of meta-models to compute the function approximation. For the point selection algorithm, this error was generated at every iteration using 2 queries per iteration with 40 total iterations yielding 80 total sample points at the conclusion of each individual run set. Since traditional DOE methods are by definition not iterative, the sample points for each of the traditional approaches that we compare against were selected independent of iterations (and by extension number of sample points).

Many DOE methods rely on some sort of random quantization when selecting the parameter samples to consider. The method of an example embodiment also relies on a level of randomness when selecting samples from the total probability mass function. So when analyzing and comparing results achieved, it is necessary to do so with multiple repetitions in order to get a better understanding of how the results are distributed. So in addition to the sampling criteria, this approach (along with the comparable DOE methods) was repeated 50 times to determine a mean/variance RMS error.

Figure 15:
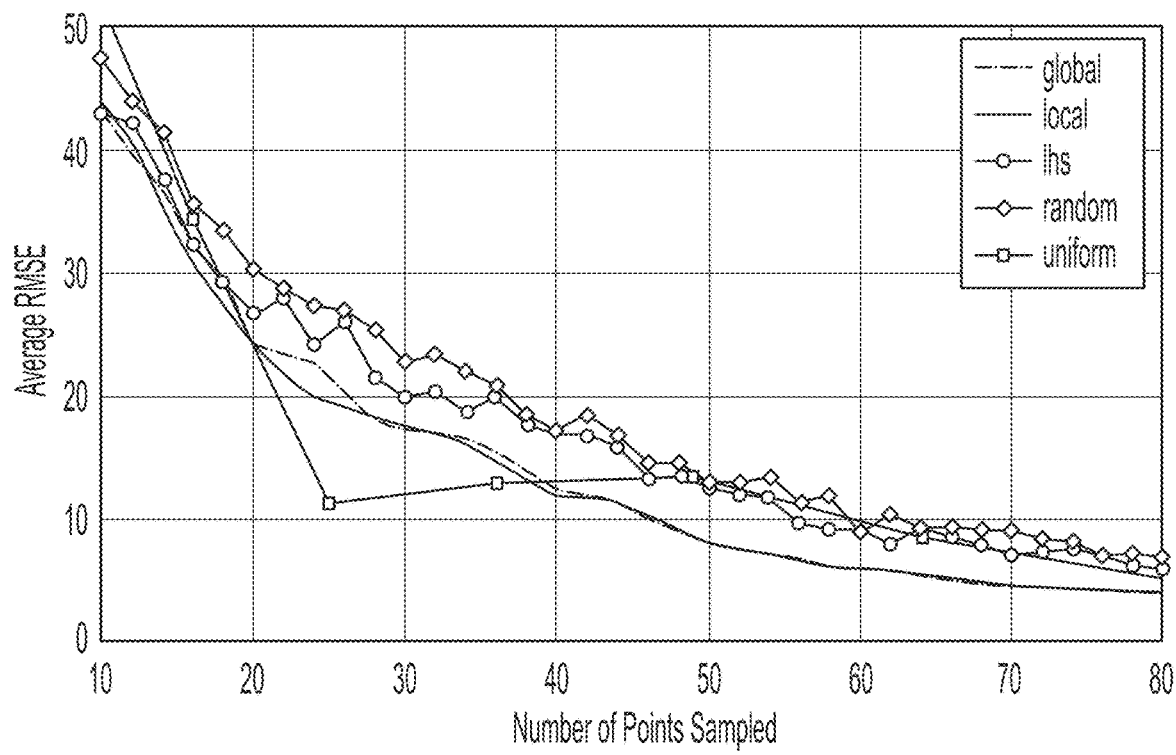
FIG. 15 shows RMS Error with respect to a number of sample points (e.g., 50 repetitions) generated for 5 parameter sampling methods in accordance with an example embodiment.

FIG. 15 shows the RMS Error with respect to the number of sample points generated for 5 parameter sampling methods. Both the global and local versions of the point selection algorithm appear to outperform traditional methods as more data is selected from the design space. For the uniform sampling case, the RMS error reported at 25 sample points is believed to be an outlier and likely due to a lucky arrangement of the design space. Additionally, it can be noticed that there is not a significant difference between the global and local approaches for this problem. The lack of an apparent difference between these approaches may indicate that this low dimensional problem is relatively simple to reconstruct.

Figure 16:
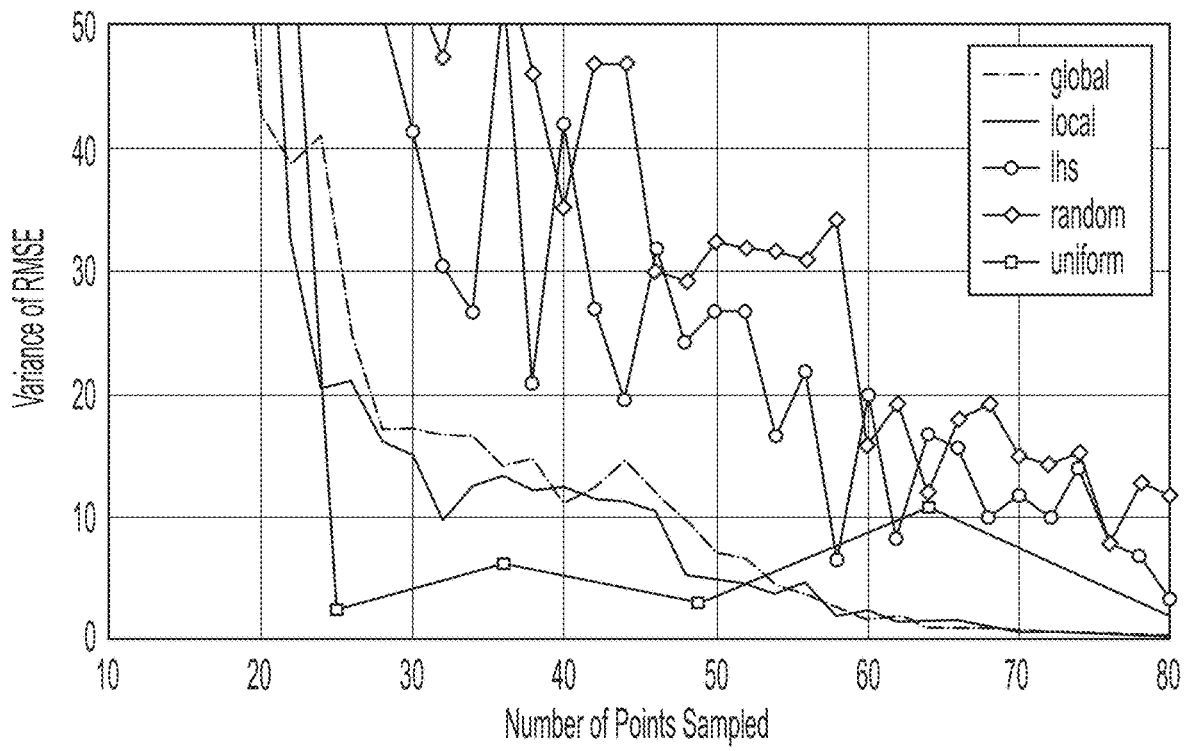
FIG. 16 shows the variance of the RMS error with respect to the number of sampled points for each method in accordance with an example embodiment.

Since 50 repetitions were generated for each of the sampling methods, an assessment can also be made as to how the errors are distributed with respect to each of the sampling methods. FIG. 16 shows the variance of the RMS error with respect to the number of sampled points for each method. Excluding uniform sampling, the point selection algorithm has the lowest variance among each of the five methods. Seeing as the sampling for the uniform approach is constant across the 50 repetitions, the variance captured reduces to the uncertainty inherent in the ensemble meta model. This is especially clear as the number of total sample points increases, the variance drops effectively to zero indicating consistent characterization of the parameter space regardless of any random permutations.

Example embodiments may therefore provide an alternative parameter sampling method that is able to more efficiently collect data for parameter space exploration and characterization. The point selection algorithm of example embodiments leverages the defining features in the parameter space to more intelligently select design points.

The described examples demonstrate the point selection algorithm is able to accurately characterize the underlying phenomenon with fewer parameter samples than traditional DOE methods. Additionally, the examples above show that the confidence in the characterization of example embodiments (via the variance of the RMS error) is higher than traditional methods. Showing that the variance effectively reduces to zero as data is collected means that the understanding of the design space is consistent and not directly tied to random perturbations in the sampling method. This can be tremendously important when attempting to answer the question of: how much data is enough? Example embodiments can provide operators with the confidence to make the call on having enough data far sooner than traditional methods.

From a technical perspective, the artificial intelligence testing tool 50 described above in reference to FIG. 1 may be used to support some or all of the operations described above. As such, the platform described in FIG. 1 may be used to facilitate the implementation of several computer program and/or network communication based interactions.

As an example, FIG. 2 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Figure 17:
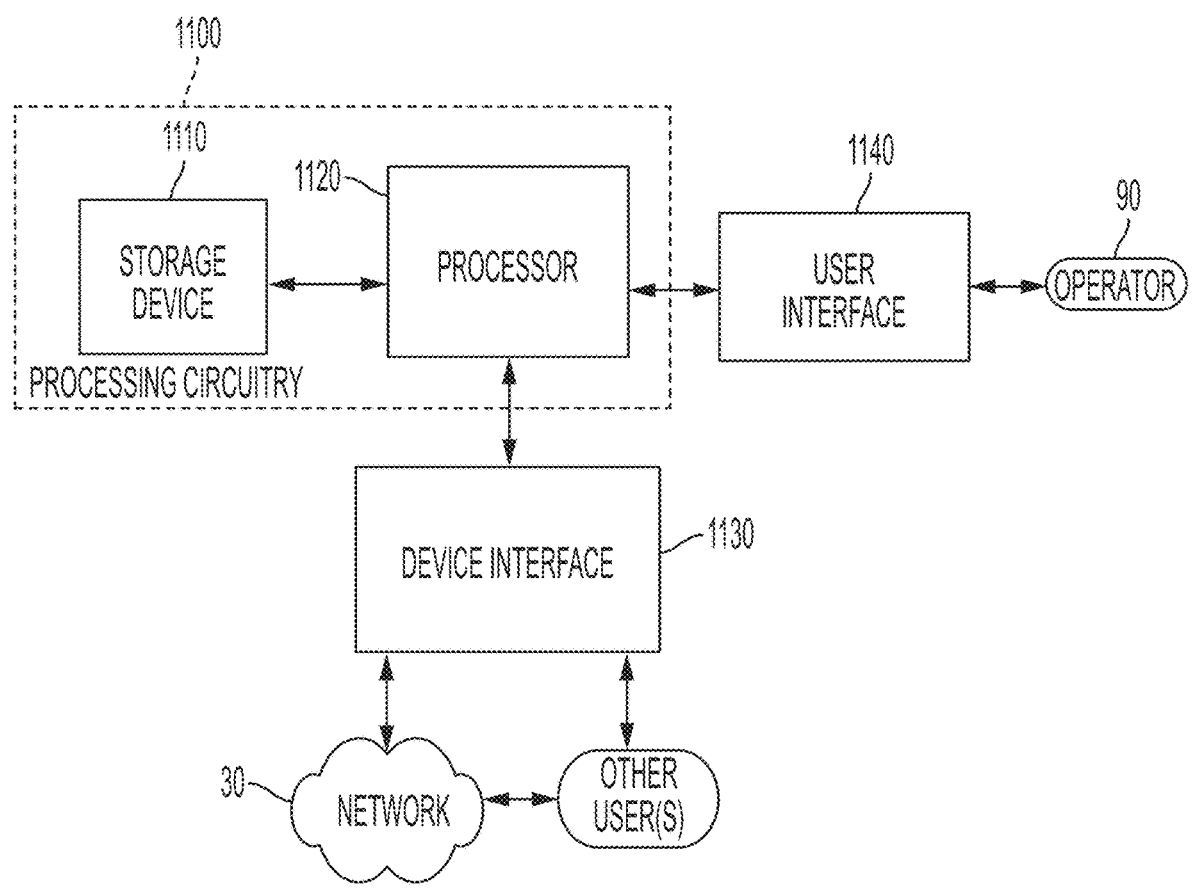
FIG. 17 illustrates a functional block diagram of an apparatus that may be configured to act as an artificial intelligence testing tool according to an example embodiment.

FIG. 17 illustrates a basic block diagram of some components that may be configured to perform individual tasks or functions of the artificial intelligence testing tool 50. For example, the artificial intelligence testing tool 50 may include processing circuitry 1100 that is configured to perform data processing, application execution and other processing and management services according to an example embodiment of the present invention. In one embodiment, the processing circuitry 1100 may include a storage device 1110 (which may be embodied as, be a portion of, or be separate from the data storage 70 of FIG. 1) and a processor 1120 that may be in communication with or otherwise control a user interface 1140 (which may be an example of the user interface 80 of FIG. 1) and a device interface 1130. As such, the processing circuitry 1100 may be embodied as a circuit chip (e.g., an integrated circuit chip) configured (e.g., with hardware, software or a combination of hardware and software) to perform operations described herein. However, in some embodiments, the processing circuitry 1100 may be embodied as a portion of a server, computer, laptop, workstation or even one of various mobile computing devices. In situations where the processing circuitry 1100 is embodied as a server or at a remotely located computing device, the user interface 1140 may be disposed at another device that may be in communication with the processing circuitry 1100 via the device interface 1130 and/or a network (e.g., network 30).

The user interface 1140 may be in communication with the processing circuitry 1100 to receive an indication of a user input at the user interface 1140 and/or to provide an audible, visual, mechanical or other output to the user (e.g., alerts or output data). As such, the user interface 1140 may include, for example, a keyboard, a mouse, a joystick, a display, a touch screen, a microphone, a speaker, a cell phone, or other input/output mechanisms. In some cases, the user interface 1140 may also include a series of web pages or interface consoles generated to guide the user through various options, commands, flow paths and/or the like for control of or interaction with the artificial intelligence testing tool 50. The user interface 1140 may also include interface consoles or message generation capabilities to send instructions, alerts, notices, etc., and/or to provide an output that clearly indicates an error computation or other metric may be at an actionable level.

The device interface 1130 may include one or more interface mechanisms for enabling communication with other devices and/or networks. In some cases, the device interface 1130 may be any means such as a device or circuitry embodied in either hardware, software, or a combination of hardware and software that is configured to receive and/or transmit data from/to a network and/or any other device or module in communication with the processing circuitry 1100. In this regard, the device interface 1130 may include, for example, hardware and/or software for enabling communications with a wireless communication network and/or a communication modem or other hardware/software for supporting communication via cable, digital subscriber line (DSL), universal serial bus (USB), Ethernet or other methods. In situations where the device interface 1130 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 1110 may include one or more non-transitory storage or memory devices such as, for example, volatile and/or non-volatile memory that may be either fixed or removable. The storage device 1110 may be configured to store information, data, applications, instructions or the like for enabling the apparatus to carry out various functions in accordance with example embodiments of the present invention. For example, the storage device 1110 could be configured to buffer input data for processing by the processor 1120. Additionally or alternatively, the storage device 1110 could be configured to store instructions for execution by the processor 1120. As yet another alternative, the storage device 1110 may include one of a plurality of databases (e.g., data storage 70) that may store a variety of files, contents or data sets such as the relationship network. Among the contents of the storage device 1110, applications may be stored for execution by the processor 1120 in order to carry out the functionality associated with each respective application.

The processor 1120 may be embodied in a number of different ways. For example, the processor 1120 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 1120 may be configured to execute instructions stored in the storage device 1110 or otherwise accessible to the processor 1120. As such, whether configured by hardware or software methods, or by a combination thereof, the processor 1120 may represent an entity (e.g., physically embodied in circuitry) capable of performing operations according to embodiments of the present invention while configured accordingly. Thus, for example, when the processor 1120 is embodied as an ASIC, FPGA or the like, the processor 1120 may be specifically configured hardware for conducting the operations described herein. Alternatively, as another example, when the processor 1120 is embodied as an executor of software instructions, the instructions may specifically configure the processor 1120 to perform the operations described herein.

In an example embodiment, the processor 1120 (or the processing circuitry 1100) may be embodied as, include or otherwise control the artificial intelligence testing tool 50, which may be any means such as a device or circuitry operating in accordance with software or otherwise embodied in hardware or a combination of hardware and software (e.g., processor 1120 operating under software control, the processor 1120 embodied as an ASIC or FPGA specifically configured to perform the operations described herein, or a combination thereof) thereby configuring the device or circuitry to perform the corresponding functions of the artificial intelligence testing tool 50 (or components thereof) as described herein.

In this regard, a method according to one embodiment of the invention (as discussed above in reference to FIG. 2) may include a method for testing systems or gathering data using artificial intelligence. The method may include creating initial sample points based on a simulation received at the apparatus, and employing cyclic evaluation of the simulation until a stopping criteria is met. Employing the cyclic evaluation may include running the simulation at design points for a set of queries associated with a current iteration of the cyclic evaluation, training a set of meta-models of parameter space associated with the simulation for the current iteration, computing a set of metrics for the current iteration, and employing a selected sampling approach to select a new set of design points for a next iteration of the cyclic evaluation.

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the method may further include enabling an operator to interface with the cyclic evaluation to alter steps associated with the cyclic evaluation based on an output associated with the set of metrics or running the simulation for the set of queries. In an example embodiment, running the simulation may further include storing an output generated by running the simulation locally or remotely at the artificial intelligence testing apparatus. In some cases, generating the set of meta-models may include generating an ensemble of meta-models to define an ensemble approximation. In an example embodiment, the stopping criteria may include achieving a given confidence level, achieving a target result, or minimizing an uncertainty metric. Moreover, the target result may include a predefined number of iterations or a given time budget. In some cases, creating the initial sample points may include defining a scenario to be studied based on modeling and simulation data defining the simulation for a specific range of input parameter conditions, employing initial discretization simulation runs to query similar instances of the scenario, training a meta-model to define an initial training instance and, based on the meta-model, proposing an ordered set of sample points for the initial training instance to fill an output subspace, the sample points defining feature space assessment criteria. In an example embodiment, training the set of meta-models may include computing an error with respect to data partitions and individual meta-models between a previous iteration and a current iteration. In some cases, computing the error may include calculating an ensemble error comprising errors associated with the ensemble approximation, computed for each data partition, or calculating an individual error comprising errors associated with each individual meta-model, computed for each data partition. In some cases, the feature space assessment criteria are weighted to favor an individual feature space assessment criteria that provides most information about how to sample parameter space associated with the scenario. In some cases, training the set of meta-models may include selecting and weighting the meta-models based on which of the meta-models provides most information about how to sample parameter space associated with the scenario. In this regard, for example, meta-models are selected and weighted to effectively describe the feature space and give precedence to algorithms that can maximize the understanding the space as more data (queries) are gathered by the sampling process.

In an example embodiment, an apparatus for performing the method described above may comprise a processor (e.g., the processor 1120) or processing circuitry configured to perform some or each of the operations (100-155) described above. The processor may, for example, be configured to perform the operations (100-155) by performing hardware implemented logical functions, executing stored instructions, or executing algorithms for performing each of the operations. In some embodiments, the processor or processing circuitry may be further configured for the additional operations or optional modifications to operations 100 to 155 that are discussed above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus for artificial intelligence testing, the apparatus comprising processing circuitry configured to execute instructions that, when executed, cause the apparatus to:
   create initial sample points based on a simulation received at the apparatus; and
   employ cyclic evaluation of the simulation until at least one criterion of a stopping criteria is met, wherein employing the cyclic evaluation comprises:
   running the simulation at design points for a set of queries associated with a current iteration of the cyclic evaluation, the design points for an initial iteration being the initial sample points;
   training a set of meta-models of parameter space associated with the simulation for the current iteration and an output of the simulation;
   computing a set of metrics for the current iteration, the set of metrics comprising feature assessment criteria (FAC) function weights for FAC functions, the FAC functions comprising a gradient function and an uncertainty function, the gradient function being weighted based on a gradient determined using a finite difference between the design points as inputs and the output of the simulation, the uncertainty function being weighted based on a measure of disagreement at each design point between each meta-model in the set of meta-models for the current iteration; and
   employing a selected sampling approach to select a new set of queries and a new set of design points associated with the new set of queries for a next iteration of the cyclic evaluation,
   the new set of queries and the new set of design points being selected based on the set of metrics for the current iteration and a set of meta-models for the next iteration of the cyclic evaluation,
   the set of meta-models for the next iteration of the cyclic evaluation being determined by eliminating selected meta-models from the set of meta-models for the current iteration based on whether an error computed for each of the meta-models for the current iteration exceeds an error threshold,
   the error being computed for each meta-model in the set of meta-models based on the set of meta-models of the current iteration and a previous set of meta-models for a previous iteration.

2. The apparatus of claim 1, wherein the running the simulation further comprises storing an output generated by running the simulation locally or remotely at the apparatus.

3. The apparatus of claim 2, wherein the training the set of meta-models comprises generating an ensemble of meta-models to define an ensemble approximation.

4. The apparatus of claim 1, wherein the stopping criteria comprise achieving a given confidence level, achieving a target result, reaching a time constraint, receiving a user intervention, and minimizing an uncertainty metric.

5. The apparatus of claim 1, wherein creating the initial sample points comprises:
   defining a scenario to be studied based on modeling and simulation data defining the simulation for a specific range of input parameter conditions;
   employing initial discretization simulation runs to query similar instances of the scenario;
   training an initial meta-model to define an initial training instance; and
   based on the initial meta-model, determining an ordered set of sample points as the initial sample points for the initial training instance to fill an output subspace, the initial sample points defining feature assessment criteria.

6. The apparatus of claim 5, wherein the feature assessment criteria are weighted to favor an individual feature assessment criteria that provides a threshold level of information about how to sample parameter space associated with the scenario.

7. The apparatus of claim 5, wherein training the set of meta-models comprises selecting and weighting meta-models of the set of meta-models based on which of the meta-models provides a threshold level of information about how to sample parameter space associated with the scenario.

8. The apparatus of claim 1, wherein the error is computed with respect to data partitions and individual meta-models.

9. The apparatus of claim 8, wherein the computing the set of metrics comprises computing the error by calculating an ensemble error comprising errors associated with an ensemble approximation, computed for each data partition.

10. The apparatus of claim 1, wherein the employing the cyclic evaluation further comprises enabling an operator to interface with the cyclic evaluation to alter steps associated with the cyclic evaluation based on an output associated with the set of metrics or running the simulation for the set of queries.

11. A method executable via operation of configured processing circuitry, the method comprising:
    creating initial sample points based on a simulation received; and
    employing cyclic evaluation of the simulation until at least one criterion of a stopping criteria is met, wherein employing the cyclic evaluation comprises:
    running the simulation at design points for a set of queries associated with a current iteration of the cyclic evaluation, the design points for an initial iteration being the initial sample points;
    training a set of meta-models of parameter space associated with the simulation for the current iteration and an output of the simulation;
    computing a set of metrics for the current iteration, the set of metrics comprising feature assessment criteria (FAC) function weights for FAC functions, the FAC functions comprising a gradient function and an uncertainty function, the gradient function being weighted based on a gradient determined using a finite difference between the design points as inputs and the output of the simulation, the uncertainty function being weighted based on a measure of disagreement at each design point between each meta-model in the set of meta-models for the current iteration; and
    employing a selected sampling approach to select a new set of queries and a new set of design points associated with the new set of queries for a next iteration of the cyclic evaluation,
    the new set of queries and the new set of design points being selected based on the set of metrics for the current iteration and a set of meta-models for the next iteration of the cyclic evaluation, the set of meta-models for the next iteration of the cyclic evaluation being determined by eliminating selected meta-models from the set of meta-models for the current iteration based on whether an error computed for each of the meta-models exceeds an error threshold, the error being computed for each meta-model in the set of meta-models based on the set of meta-models of the current iteration and a previous set of meta-models for a previous iteration.

12. The method of claim 11, wherein training the set of meta-models comprises generating an ensemble of meta-models to define an ensemble approximation.

13. The method of claim 11, wherein the stopping criteria comprise achieving a given confidence level, achieving a target result, reaching a time constraint, receiving a user intervention, and minimizing an uncertainty metric.

14. The method of claim 11, wherein the creating the initial sample points comprises:
defining a scenario to be studied based on modeling and simulation data defining the simulation for a specific range of input parameter conditions;
employing initial discretization simulation runs to query similar instances of the scenario;
training an initial meta-model to define an initial training instance; and
based on the initial meta-model, determining an ordered set of sample points as the initial sample points for the initial training instance to fill an output subspace, the initial sample points defining feature space assessment criteria.

15. The method of claim 14, wherein the feature assessment criteria are weighted to favor an individual feature assessment criteria that provides a threshold level of information about how to sample parameter space associated with the scenario.

16. The method of claim 11, wherein the error is computed with respect to data partitions and individual meta-models.

17. The method of claim 16, wherein the computing the set of metrics comprises computing the error by calculating an ensemble error comprising errors associated with an ensemble approximation, computed for each data partition.

18. The method of claim 11, further comprising enabling an operator to interface with the cyclic evaluation to alter steps associated with the cyclic evaluation based on an output associated with the set of metrics or running the simulation for the set of queries.

19. The apparatus of claim 1, wherein each FAC function comprises a probability mass function that maps a probability of selecting a query that is used for determining a design point with a query pool of input parameters for the simulation.

20. The method of claim 1, wherein each FAC function comprises a probability mass function that maps a probability of selecting a query that is used for determining a design point with a query pool of input parameters for the simulation.

* * * * *